P. J. SPEICHER.
COOP.
APPLICATION FILED JAN. 28, 1914.
1,303,736.
Patented May 13, 1919.
3 SHEETS—SHEET 1.
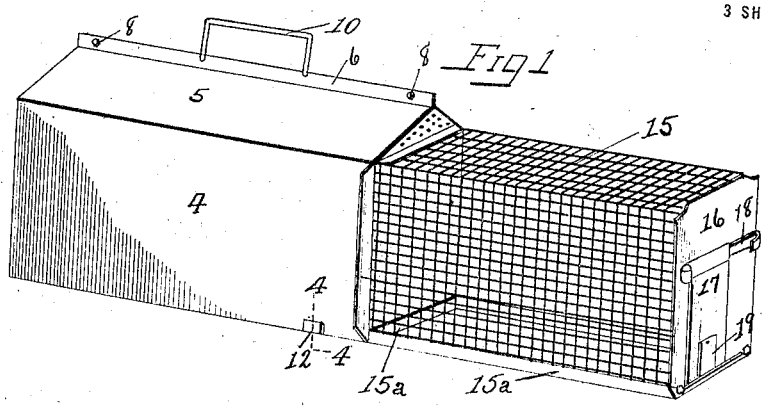
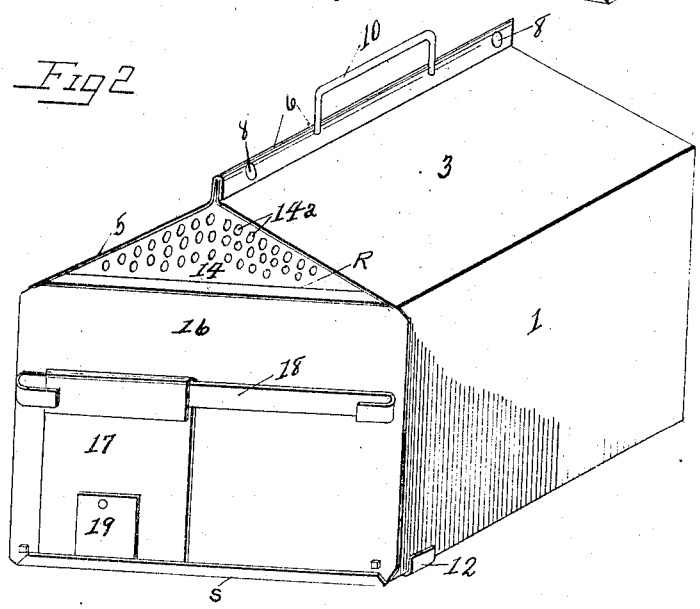
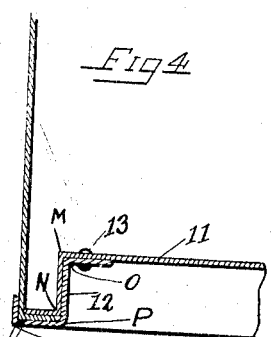
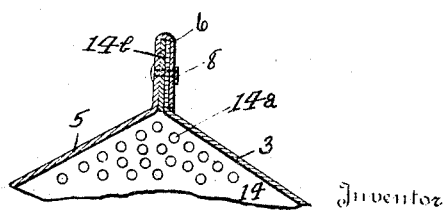
Witnesses
C. F. Miller
D. R. Beers
Inventor
Paul J. Speicher
By Geo. P. Kimmel
Attorney

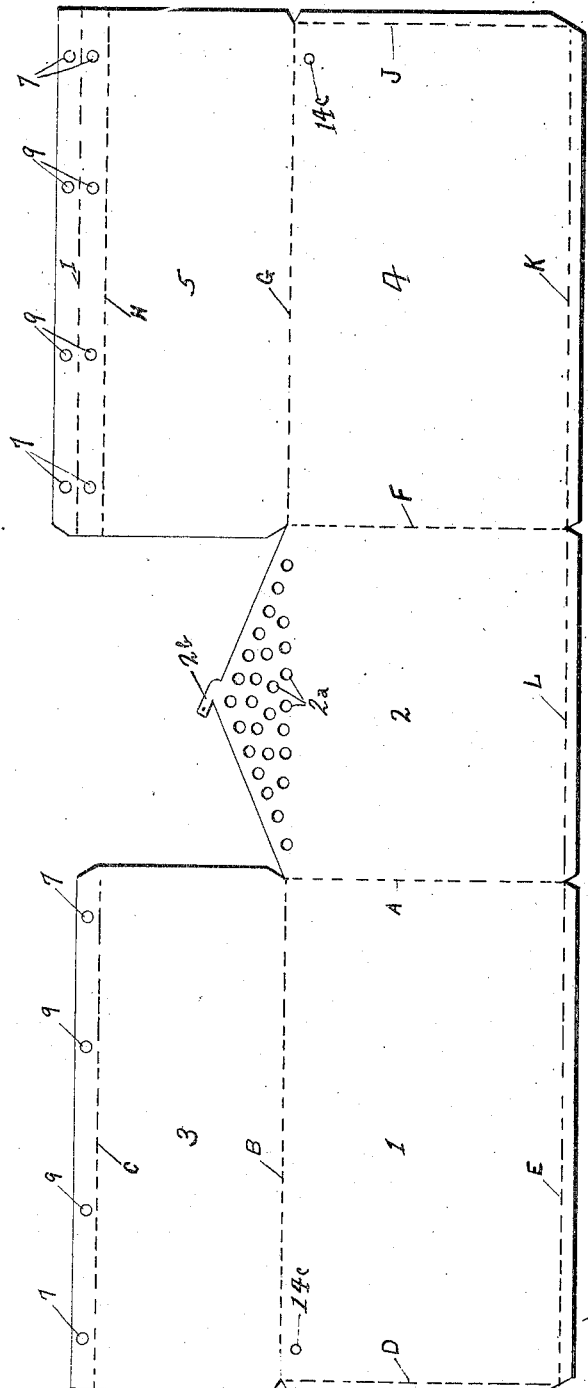

P. J. SPEICHER.
COOP.
APPLICATION FILED JAN. 28, 1914.
1,303,736.
Patented May 13, 1919.
3 SHEETS—SHEET 3.
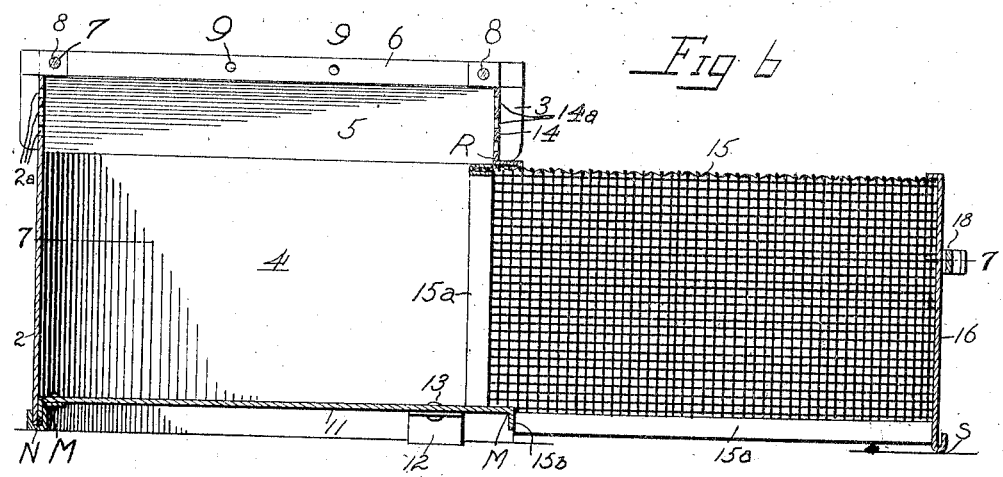
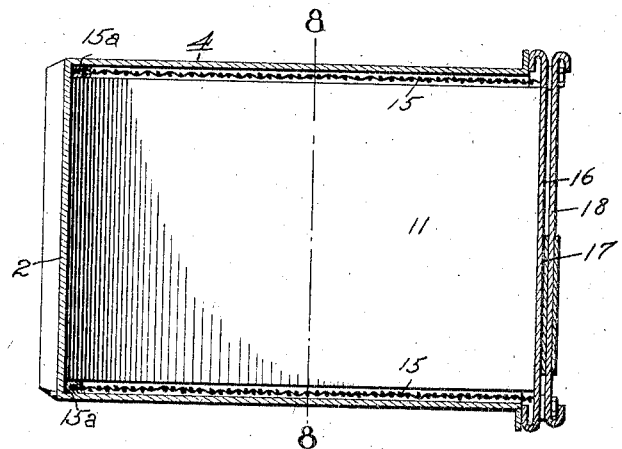
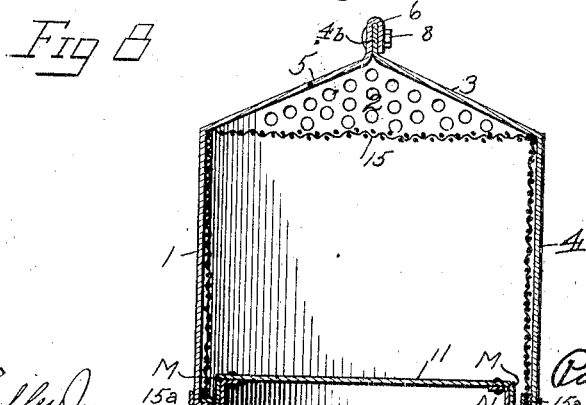
Witnesses
C. F. Miller
E. R. Jacobson
Inventor
Paul J. Speicher
By Geo. F. Kimmel
Attorney

UNITED STATES PATENT OFFICE.

PAUL J. SPEICHER, OF GASTON, INDIANA, ASSIGNOR, BY DIRECT AND MESNE ASSIGNMENTS, TO THE CYCLONE MANUFACTURING COMPANY, OF URBANA, INDIANA.

COOP.

1,303,736.

Specification of Letters Patent.

Patented May 13, 1919.

Application filed January 28, 1914. Serial No. 814,864.

*To all whom it may concern:*

Be it known that I, PAUL J. SPEICHER, a citizen of the United States, residing at Gaston, in the county of Delaware and State of Indiana, have invented certain new and useful Improvements in Coops, of which the following is a specification.

This invention relates to improvements in coops and more specifically to telescoping parking coops.

The object of my invention is to provide a telescoping parking coop, which may be extended in pleasant weather to allow thorough ventilation and sunshine to penetrate the parking addition, or closed in inclement weather or at night as a protection against animals. My coop is made preferably of rust proof metal so reinforced as to be rigid and stable and, having a removable floor, the cleaning of the coop is made easy, insects are eliminated and perfect sanitation established.

Other objects of this invention, not at this time more particularly enumerated, will be clearly understood from the detailed description and drawings forming a part of this specification.

Furthermore, this invention consists in the novel arrangement and combination of parts more particularly described in the following description and embodied in the claims appended hereunto and forming a part of this specification.

Referring now to the drawings which form a part of this specification Figure 1 is a perspective of my coop with parking addition extended, while Fig. 2 is a perspective with parking addition closed. Fig. 3 is a side elevation showing the manner in which a sheet of metal is cut to form the top, sides and rear end of the closed portion of my coop. Fig. 4 is a fragmental detail cross-sectional view of the sliding floor arrangement taken on a line 4—4 of Fig. 1, while Fig. 5 is a fragmental detail showing manner of reinforcing the roof.

Fig. 6 is a longitudinal sectional view taken through the center of the coop, which is shown in open position. Fig. 7 is a horizontal sectional view taken on the line 7—7 of Fig. 6 the coop being shown in closed position. Fig. 8 is a transverse sectional view of the coop taken on the line 8—8 of Fig. 7.

Referring further to the drawings wherein similar reference characters designate similar parts throughout the respective views, 1 designates one side of my coop proper which is bent forwardly at a point along the line A to form a right angle to the rear end of the coop 2, said rear end being provided near its top with a plurality of holes $2^a$ for the purpose of ventilation. The apex of the said end 2 is so cut as to form a tongue $2^b$ having a hole therethrough and adapted to be bent at right angles to said end 2 so as to fit within the ridge of the roof to be hereinafter described. 3 designates one side of the top which is bent downwardly along the line B, to a point at rest upon the sloping top of end 2. Said top of the roof portion 3 is then bent upwardly at C. The side portion 1 is bent outwardly at D to a point at right angles to the side 1, and is also bent inwardly at E to a point at right angles to the side 1, this having the effect of reinforcing and producing rigidity in the structure, and also forming a slide for the floor 11. The opposite side 4 is likewise bent forwardly at F, and the roof or top portion 5, is bent downwardly at G, upwardly at H, and downwardly at I in such manner as to lap over the upwardly bent portion of top 3 and the tongue $2^b$ of rear end 2, and the tongue $14^b$ of triangular front piece 14 hereinafter described. The ridge 6 of the roof, thus formed, is provided with holes 7 whereby the same is held securely together by bolts 8 passing therethrough and through the holes in tongues $2^b$ and $14^b$. The ridge 6 is also provided with holes 9 through which a handle 10 may be secured for carrying the coop. The side 4 is bent outwardly at J to a point at right angles to the side 4, and is also bent inwardly at K to a point at right angles to the side 4. The rear end 2 is bent outwardly at L to a point at right angles to the end 2. The floor 11 is formed of a sheet of metal bent downwardly in front forming the flange $15^b$ and downwardly and rearwardly at the back for the purpose of rigidity and to form a tight closure by being adapted to slide beneath the outwardly bent portion of end 2, thus serving to hold the floor down tight. The said floor portion is also bent downwardly along the entire length of the sides at M and outwardly at N in such manner as to slide upon the inwardly bent portions of the sides 1 and 4 and also to serve as a drain for any water which may get upon the floor, thus keeping the floor dry at all times. A narrow metal strip 12 is secured by rivets 13 at a certain point upon the floor 11, said strip being bent downwardly at O, outwardly at P, and upwardly at Q so as to come up slightly over the under side of the coop, thus holding the floor securely in place and at the same time permitting it to be slid in and out. The front gable portion of the coop is provided with a triangular piece of sheet metal 14 bent outwardly at R, extending to a point opposite the eaves of the roof, where it is secured by bolts passing through holes 14ᶜ on both sides of the coop. The gable portion 14 has a tongue 14ᵇ at its apex similar to and for the same purpose as tongue 2ᵇ of rear end 2, said portion also being provided with holes 14ᵃ for the purpose of ventilation.

The parking addition is made of a wire netting portion 15 with a metal strip 15ᵃ along its rear and bottom edge, said parking addition being made of a size adapted to slide within the coop proper. The rear end and bottom are left open and the front portion is closed solidly by means of a sheet of metal 16 bent upwardly at S to form a slide for the door 17 which is slidably mounted on a metal strip 18 secured across the front of the parking addition. Said sliding door is further provided with a small door 19 which may be opened to permit egress and ingress of the smaller fowls without permitting the larger fowls to get out of the coop.

Having now described and pointed out the new and useful features of my invention, I do not limit myself to the shape of certain parts where the shape is not essential, nor do I restrict myself to the exact details of construction shown and described, but mean and intend to claim all equivalents and variations thereof not departing in principle from my invention and falling within the purview of the appended claims.

What I claim as my invention and desire to secure by Letters Patent is:

1. A coop comprising a back and integral sides and roof, said roof consisting of oppositely-arranged downwardly-inclined sides, an upstanding tab formed at the apex of said back, a coextensive bead formed upon the edge of one of the sides of the roof, an outturned flange formed upon the opposite of said sides arranged to fit into said bead, securing elements engaging said flange and said bead, a front triangular plate fitting between said sides at their upper end, inturned flanges formed upon the bottom of said sides, a bottom having angle-iron parts secured thereto and adapted to hold said bottom slidably to said last named flanges, said front and back being provided with a plurality of openings, and a wire inclosure telescoping in said coop.

2. In a parking coop, in combination, a covering, inwardly formed flanges upon the sides at the bottom of said covering, a slidable bottom formed with downwardly extending L-shaped flanges along the sides thereof, the base of said flanges adapted to slide upon the top of the said inwardly formed flanges so as to raise said bottom above the ground and form a groove between the sides of said bottom and the sides of said covering, a parking addition open at one end thereof adapted to slide within the open end of said covering, said parking addition formed with latticed sides and top, an end plate mounted upon one end of said parking addition, and means secured to said end adapted to permit egress and ingress to said coop.

3. A brood coop consisting of two telescopic sections, the main section of which is closed at the top, sides and one end and having a raised bottom forming grooves, and the other or screen section resting in said grooves and open at one end and bottom and provided in its closed end with an opening, and a door for said opening, the said screen section adapted to be moved into and out of the main section.

4. A brood coop consisting of a main section made of sheet metal and open at one end, the bottom of said main section being provided at its side edges with grooves, and a screen section the lower edges of which rest in said grooves, the said screen section being open at one end and at its bottom and provided with a door at its other end, and adapted to be moved into and out of the main section.

5. In a brood coop, a pair of telescopic sections, one of said sections being formed of screening, the other section having solid side and top walls and an end, flanges formed on said side walls, a floor having marginal flanges to slidably engage the flanges on the side walls, said flanges forming guideways for said screen section and drains for the floor.

6. In a brood coop, a pair of telescopically related sections, one of the sections being formed of screening, the other section having solid side and top walls and an end, said sides having base flanges thereon, a floor having downwardly and outwardly bent flanges to slide on said base flanges, said flanges serving to maintain the floor in a plane remote from the earth, and said last mentioned flanges providing guideways for the screen section.

7. A brood coop consisting of a main section made of sheet metal and open at one end, the bottom of said main section being provided at its side edges with grooves, and a screen section the lower edges of which rest in said grooves, the said screen section being open at one end and at its bottom and provided with a door at its other end, and adapted to be moved into and out of the main section.

8. In a brood coop, a pair of telescopically related sections, one of the sections being formed partly of screen, the other section having side walls, top and an end, said sides having base flanges thereon, a floor member having downwardly and outwardly bent flanges to slide on said base flanges, said flanges serving to maintain the floor in a plane remote from the earth, means engageable with said floor member adapted to retain the same upon said base flanges, and said last mentioned flanges providing guideways for the screen section.

In testimony whereof I affix my signature in presence of two witnesses.

PAUL J. SPEICHER.

Witnesses:
C. L. HOUCK,
J. E. KELLEY.